United States Patent
Wilson

(10) Patent No.: US 10,445,573 B2
(45) Date of Patent: Oct. 15, 2019

(54) GAZE DETECTION DEVICE

(71) Applicant: FOVE, INC., San Mateo, CA (US)

(72) Inventor: Lochlainn Wilson, Tokyo (JP)

(73) Assignee: FOVE, INC., San Mateo, CA (US)

( * ) Notice: Subject to any disclaimer, the term of this patent is extended or adjusted under 35 U.S.C. 154(b) by 0 days.

(21) Appl. No.: 15/322,401

(22) PCT Filed: Jun. 27, 2014

(86) PCT No.: PCT/JP2014/067197
§ 371 (c)(1),
(2) Date: Dec. 27, 2016

(87) PCT Pub. No.: WO2015/198477
PCT Pub. Date: Dec. 30, 2015

(65) Prior Publication Data
US 2017/0140223 A1 May 18, 2017

(51) Int. Cl.
*G06K 9/00* (2006.01)
*G02B 27/00* (2006.01)
(Continued)

(52) U.S. Cl.
CPC ..... *G06K 9/00604* (2013.01); *G02B 27/0093* (2013.01); *G02B 27/0172* (2013.01); *G06F 3/013* (2013.01); *H04N 5/247* (2013.01); *H04N 5/33* (2013.01); *G02B 2027/0138* (2013.01); *G02B 2027/0187* (2013.01)

(58) Field of Classification Search
USPC ......................................................... 348/78
See application file for complete search history.

(56) References Cited

U.S. PATENT DOCUMENTS 6,018,630 A 1/2000 Arai et al.
6,091,378 A * 7/2000 Richardson ........ G02B 27/0093
345/156
(Continued)

FOREIGN PATENT DOCUMENTS

JP H07-077665 A 3/1995
JP H08-009205 A 1/1996
(Continued)

OTHER PUBLICATIONS

Notice of Reasons for Refusal issued in counterpart Japanese Patent Application No. 2016-528961, dated Oct. 31, 2017.
(Continued)

*Primary Examiner* — Patricia I Young
(74) *Attorney, Agent, or Firm* — Venable LLP; Adam R. Hess; Laura G. Remus

(57) ABSTRACT

[Problem] To reduce the size of a head-mounted display or other typical display device comprising a gaze detection device.
[Solution] A gaze detection device comprising a semi-reflective mirror 13 that partly transmits and partly reflects incident light, and one or more gaze analysis cameras that capture images of the user's eye 10 reflected in the semi-reflective mirror 13, wherein the semi-reflective mirror 13 is positioned to face the eyes 10 of the user and images of the user's eye 10 reflected in the semi-reflective mirror 13 are captured by one or more abovementioned cameras.

5 Claims, 4 Drawing Sheets

(51) Int. Cl.
  *G02B 27/01* (2006.01)
  *G06F 3/01* (2006.01)
  *H04N 5/247* (2006.01)
  *H04N 5/33* (2006.01)

(56) References Cited

U.S. PATENT DOCUMENTS

| | | | |
|---|---|---|---|
| 6,611,283 B1 | 8/2003 | Isonuma | |
| 2003/0234823 A1* | 12/2003 | Sato | G06F 3/013 |
| | | | 715/848 |
| 2014/0160157 A1* | 6/2014 | Poulos | G06F 3/011 |
| | | | 345/633 |
| 2015/0084840 A1* | 3/2015 | Kim | G02B 27/017 |
| | | | 345/8 |
| 2016/0180591 A1* | 6/2016 | Shiu | G02B 27/0172 |
| | | | 345/633 |
| 2016/0335475 A1* | 11/2016 | Krenzer | G06K 9/00335 |
| 2017/0147859 A1* | 5/2017 | Zhang | G02B 27/0093 |

FOREIGN PATENT DOCUMENTS

| | | | |
|---|---|---|---|
| JP | H11-155152 A | | 6/1999 |
| JP | 2003-225207 A | | 8/2003 |
| JP | 2003-230539 A | | 8/2003 |
| JP | 2006-163383 A | | 6/2006 |
| JP | 2014-021272 A | | 2/2014 |
| JP | 2014-022942 A | | 2/2014 |
| JP | 2014-022942 | * | 3/2014 |

OTHER PUBLICATIONS

Notice of Reasons for Refusal issued in counterpart Japanese Patent Application No. 2016-528961, dated May 22, 2018.

* cited by examiner

GAZE DETECTION DEVICE

TECHNICAL FIELD

This disclosure relates to a gaze detection device used in a head-mounted display (HMD) or related devices.

BACKGROUND ART

According to existing technology, a user's focus point can be determined from a picture of the eye, wherein a semi-reflective mirror positioned at an approximately 45 degree tilt angle is used for a near-right-angle reflective optical path that connects the eye and the camera (patent document 3). The same technique applies to HMDs and other similar devices mounted on a user's head (patent document 1).

Technology for changing the video on a video display of a HMD by means of neck movement is disclosed in patent document 2.

PATENT REFERENCES

Patent document 1: JP-A-2001-108933
Patent document 2: JP-A-H08-179239
Patent document 3: JP-A-H05-076497

SUMMARY OF INVENTION

Technical Problem

As described above, in existing gaze detection devices, a semi-reflective mirror 13 is disposed at a tilt angle of about 45 degrees relative to the user's facing direction, and an image of the user's eye 10 is captured by a camera 12, wherein the camera is positioned on an optical path that connects the user's eye 10 and the camera 12 at a reflection angle of about 45 degrees (FIG. 7). The space required by the diagonal semi-reflective mirror in front of the eye 10 of the user is the main obstacle to miniaturizing the device.

If a smaller semi-reflective mirror were to be used for the purpose of reducing the size of the device, edges of the semi-reflective mirror would be present between the user's eye and the display, disrupting the video reproduction due to the presence of unintended visual artefacts caused by refraction and reflection of light at the edges of the semi-reflective mirror. For this reason, device miniaturization is at present incompatible with high-quality video reproduction.

In existing gaze detection devices, where the camera 12 used for capturing images of the user's eye 10, is positioned above the eye of the user, capturing images of the user's eye 10 with the camera 12 may be obstructed by the eyelid and the upper eyelash when the user continues to watch the video but even slightly lowers an eyelid.

Means of Solving the Problem

The abovementioned problem can be solved by a gaze detection device comprising one or more semi-reflecting mirrors that partly reflect and partly transmit incident light, and one or more gaze analysis cameras that capture images of the user's eye reflected in a semi-reflective mirror, wherein the function of a camera is to capture images of the user's eye reflected in a semi-reflective mirror that faces the eyes of the user. The camera capturing images of an eye of the user is positioned outside of the user's field of view and captures images of the user's eye reflected in a semi-reflective mirror. The camera is therefore positioned so that images of the user's eye can be captured without blocking the user's vision.

Another solution to the problem is a head-mounted display that encloses a gaze detection device in a casing that can be secured to the head of a user, wherein the gaze detection device comprises one or more displays, a semi-reflective mirror, and a camera.

Another solution to the problem is a gaze detection device that can be used with a detachable display, wherein the gaze detection device is enclosed in a casing that can be secured to the head of a user and comprises a semi-reflective mirror, one or more lenses facing the semi-reflective mirror, and a camera.

Another solution to the problem is the gaze tracking device of the present invention, wherein the semi-reflective mirror is preferably a hot mirror that transmits visible light and reflects infra-red light.

Another solution to the problem is the gaze tracking device of the present invention, wherein a camera is preferably positioned below the user's eye.

The gaze tracking device of the present invention, wherein a camera preferably captures images of both eyes of the user, and the parallax of the user's eyes is used to calculate the coordinates of the gaze focus point.

Advantageous Effects of the Invention

The above configuration comprises a semi-reflective mirror for which incident light is reflected in part and transmitted in part, and a camera that captures images of the user's eye reflected in the semi-reflective mirror, wherein the semi-reflective mirror is positioned to face the the user's eyes. Therefore, compared to existing products, where the semi-reflective mirror is in a tilting position, as shown in FIG. 7, no space is required for positioning a tilted semi-reflective mirror, and there is no need to have a separate semi-reflective mirror in addition to the display. Thus, even if the semi-reflective mirror covers the whole surface of the display, the space needed in front of the head is smaller. Also, since there is no need to use a smaller semi-reflective mirror for miniaturizing the device, the edges of the semi-reflective mirror do not appear in the field of view and the influence of the edges on the video presentation can be eliminated. In this way, positioning the semi-reflective mirror to face the user's eyes is compatible with device miniaturization and high-quality video reproduction.

When a semi-reflective mirror is combined with a gaze analysis camera that captures images of the user's eye reflected in the semi-reflective mirror, light emitted by the display can reach the eye of the user while light for imaging the user's eye is delivered outside of the user's field of view by the semi-reflective mirror. The camera can thus be positioned so as not to disturb the user's view of the video.

In case the gaze detection device is not used in a HMD, while the user views the outside scene through the semi-reflective mirror, the gaze detection device camera can capture images of the user's eye and acquire the user's gaze information.

In case the semi-reflective mirror is a hot mirror that transmits visible light and reflects infrared light, the semi-reflective hot mirror does not influence vision and the influence on the video presentation is small.

In case the gaze detection device comprising a lens, a camera, and a semi-reflective mirror is built into a casing that can be used with a detachable display, it is possible to use the gaze detection device of the present invention to provide a gaze detection function for existing HMDs that are outside of the scope of the present invention by attaching an external casing.

If a conventional display is enclosed in a casing, the conventional display can be used to display a three-dimensional video.

If the user lowers even slightly an eyelid, the upper half of the eye can become concealed. For a camera positioned above an eye, capturing of images of the user's eye from above may be hindered by the user's eyelid and eyelashes. In case the camera used for capturing images a user's eye is positioned below the eye, images can be more reliably captured from below than for conventional products where the camera is set above the eye.

In case a camera captures images of both eyes and the coordinates of the focal point of the user's eyes is calculated from the parallax, the convergence angle calculated from the parallax can be used to acquire the gaze position not only in the up-down and left-right directions, but also in the front-back direction.

DETAILED DESCRIPTION OF THE EMBODIMENTS

Figure 1:
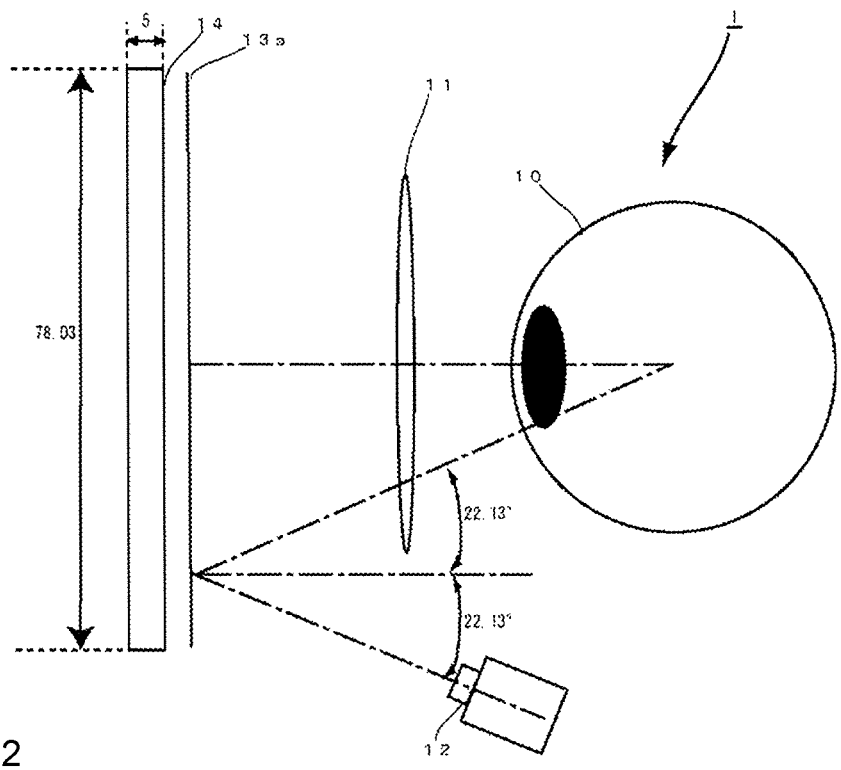
FIG. 1 is a structural diagram of the HMD of the present invention according to the first embodiment.

FIG. 1 shows the inner configuration for the case where the gaze detection device of the present invention is in a HMD, according to the first embodiment. As shown in FIG. 1, the gaze detection device according to the first embodiment comprises a hot mirror 13a as a semi-reflective mirror that passes visible light and reflects only infrared light, and a gaze analysis camera 12 for capturing images of the user's eye 10, reflected in the hot mirror 13a, wherein the hot mirror 13a is positioned in front of and facing the user's eye 10.

When the hot mirror 13a is combined with one or more gaze analysis cameras that capture images of the user's eye 10 reflected in the hot mirror 13a, light emitted from the display 14 reaches the eye 10 of the user and at the same time, infrared light used for capturing images of the user's eye 10 is delivered by the hot mirror to outside of the user's field of view. The camera 12 can thus be positioned at a location where it does not disturb the user's view of the video. By using the hot mirror 13a as the semi-reflective mirror, the semi-reflective mirror as little effect on vision and thus has little influence on the video presentation. Within the field of vision of the user, the whole surface of the display 14 is covered by the hot mirror 13a.

The lens 11 adjusts the focal distance for the user. For example, according to the first embodiment, when the distance from the display is about 20 mm, it would be difficult for the user to see clearly the video on the display 14 without the lens 11. In this situation, the lens 11 changes the focal distance of the display 14, adjusting the focal distance to make it easier for the user to see the video.

The camera 12 captures images of a user's eye via the hot mirror 13a, which is used as a semi-reflective mirror. By using a hot mirror 13a as the semi-reflective mirror, the camera 12 may be placed in a location where it does not enter the user's field of view while capturing images of the user's eye 10. Using the images captured by the camera 12, the user's gaze, frequency of eye movement, and involuntary eye movement can be measured.

Figure 7:
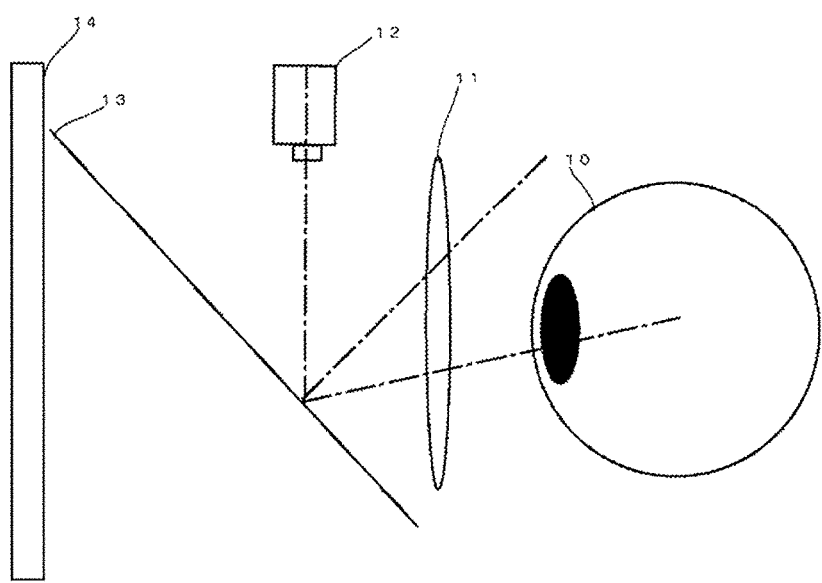
FIG. 7 is a structural diagram of a conventional existing HMD.

When a hot mirror 13a is used as the semi-reflective mirror and positioned to face the eyes of the user, in comparison to existing products, illustrated in FIG. 7, where a semi-reflective mirror is set in a tilted position, the space required by the tilted semi-reflective mirror is not needed, and the required volume in front of the head can be reduced. For example, as shown in the example in FIG. 1, the optical axis linking the camera 12 and the user's eye may be reflected at an angle of 22.13 degrees. In this case, the display 14 has a thickness of 5 mm and a width of 78.03 mm. The distance between the user's eye 10 and the display 14 is about 20 mm.

According to the first embodiment, the display 14 used for presenting a video to the user is a miniature high-resolution device.

According to the first embodiment, the camera 12 used for capturing images of the user's eye 10 is position below the eye 10 of the user. Images of the user's eye 10 can be reliably captured since the image capture by the camera 12 is not obstructed by the user's eyelid or the upper eyelashes.

Figure 2:
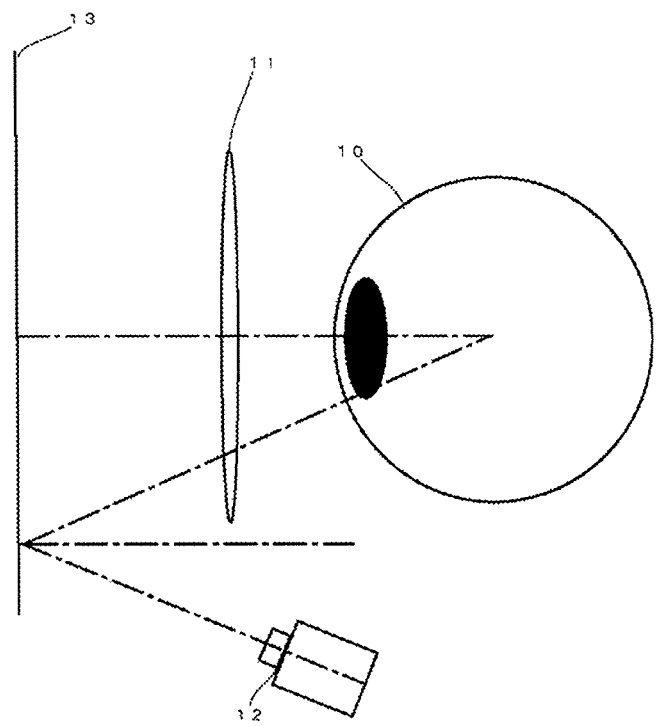
FIG. 2 is a structural diagram of the HMD of the present invention according to the first variant.

FIG. 2 illustrates the first variant of the present invention, wherein the gaze detection device is not a part of a HMD. While wearing the device, the user can see the outside scene by light transmitted through the semi-reflective mirror 13. A personal computer monitor, etc., may be positioned in front of the user's eyes for displaying a video outside of the components worn by the user. The camera 12 in the gaze detection device is used for capturing images of the user's eye 10 for the purpose of acquiring the user's gaze.

Figure 3:
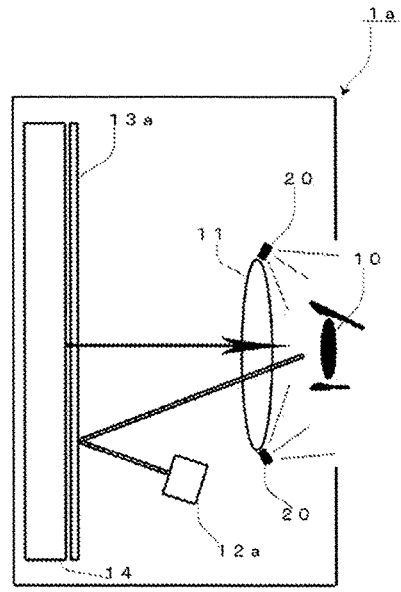
FIG. 3 is a structural diagram of the HMD according to the second variant, wherein images of an eye are captured under infrared light from an infrared light emitter device.

In the second variant of the present invention, as illustrated in FIG. 3, a hot mirror 13a is used as a semi-reflective mirror and the user's eye 10 is illuminated by an integrated infrared light emitter device 20. The visible light of the video is transmitted through the hot mirror 13a used as the semi-reflective mirror, and reaches the eye 10 of the user, while the camera is an infrared camera 12, which captures images of the user's eye 10 reflected in the hot mirror 13a. The infrared light emitter device 20 illuminates the user's eye 10 with infrared light for reliably capturing images of the user's eye 10.

One or more cameras 12 and one or more semi-reflective mirrors 13 may be used. In the case that a single camera 12 is used, the camera 12 may capture images of a single eye of the user or it may capture images of both eyes.

Figure 4:
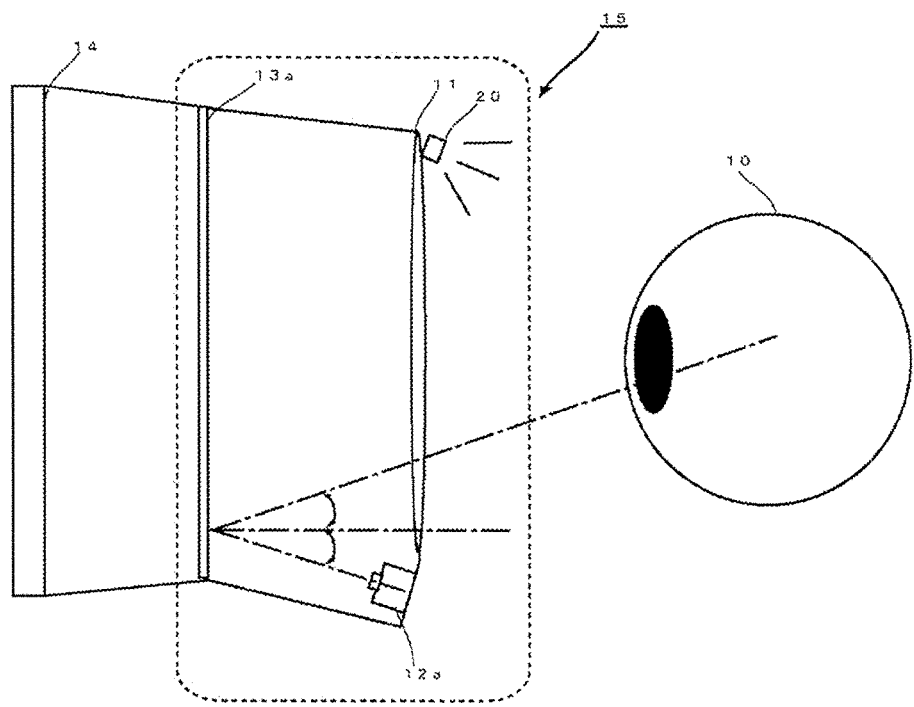
FIG. 4 is a structural diagram according to the third variant, wherein a camera and a lens are attached to a single element that is enclosed together with a semi-reflective mirror in a casing that can be detached from a display.

The third variant is illustrated in FIG. 4, wherein a removable casing 15 is positioned between the eyes 10 of the user and the display 14. The casing 15 holds a hot mirror 13a, one or more lenses facing the hot mirror 13a that is used as a semi-reflective mirror, an infrared camera 12a, and an infrared light emitter device 20, wherein the casing is removable from the display 14 as a separate unit. The casing 15 of the third variant can be attached as a replaceable part to an existing HMD product. Head mounted display having the gaze detection device is not space-saving design. Though the distance between the user's eye 10 and display 14 is the same of the conventional head mounted display. However the user can introduce the gaze detection device to the head mounted display without buying a whole new one.

In the third variant, when a conventional display is used for displaying three-dimensional video, the display is divided in the middle into left and right regions. Video images for the left and right eyes are delivered to the user by displaying on the left and right parts of the display. A gaze detection device can be added to this type of display by attaching the separate casing 15.

Figure 5:
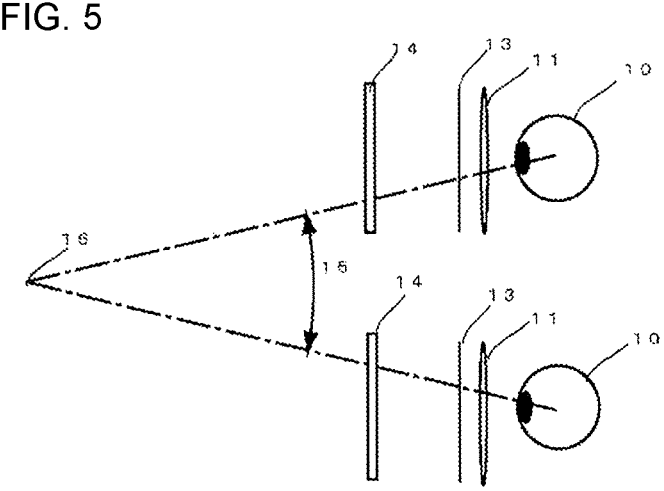
FIG. 5 is a structural diagram according to the fourth variant, wherein images of both eyes are captured.

In the fourth variant, as illustrated in FIG. 5, the camera 12 captures images of both eyes of the user. Camera 12 captures images of both eyes of the user, the spatial coordinates of the focal point 17 are calculated from the parallax 16 of the user's eyes 10, and the spatial coordinates of the gaze point 16 can be acquired, wherein the spatial coordinates include not only the up-down and left-right directions on the surface of a planar display but also the front-back direction.

Figure 6:
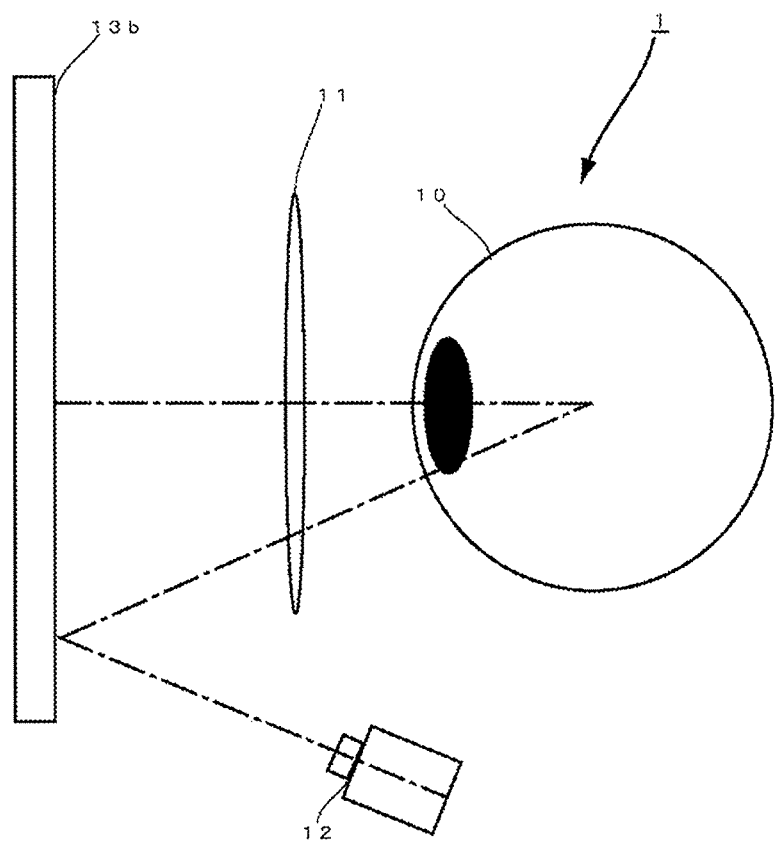
FIG. 6 is a structural diagram according to the fifth variant, wherein the display serves as a semi-reflective mirror.

The fifth variant is illustrated in FIG. 6, wherein the display itself functions as a semi-reflective mirror 13b. When the display is used as a semi-reflective mirror 13b for capturing the reflected images of the user's eye 10, no space is needed for a tilted semi-reflective mirror and the space required in front of the head becomes smaller, and the edges of the semi-reflective mirror have no effect on the video presentation.

INDUSTRIAL APPLICABILITY

The present invention may be implemented in various ways within the scope of the invention without deviating from the purpose. For example, the abovementioned embodiments considered acquiring the user's gaze, frequency of eye movement, involuntary eye movement, and facial orientation, but may also be used to acquire the change of the pupil size, the eyelid position, blinking rate, eye moisture level, etc.

In case the gaze detection device is not a part of a HMD, the semi-reflective mirror 13 may be implemented as glasses for viewing stereoscopic video.

When the camera 12 is positioned below the eye 10 of the user, the camera 12 may positioned directly below an eye, centered relative to the face, or aligned with the edge of the face.

A half mirror with an approximately 1-to-1 ratio of transmitted and reflected light may be used as the semi-reflective mirror. Light from the video display 14 is partly transmitted through the half mirror and the video on the display 14 is presented to the user, while the light used for capturing images of the user's eye 10 is partly reflected from the half-mirror and reaches the camera 12.

LIST OF SYMBOLS

1 HMD-type gaze detection device of the present invention
1a HMD-type gaze detection device of the present invention with an infrared emitter device
10 Eye
11 Lens
12 Camera
12a Infrared camera
13 Semi-reflective mirror
13a Hot mirror
13b Display as a semi-reflective mirror
14 Display
15 Casing
16 Parallax
17 Gaze point
20 Infrared emitter device

What is claimed is:

1. A gaze detection device comprising:
one or more displays having a display surface;
a semi-reflective mirror that partly reflects and partly transmits incident light, the semi-reflective mirror being arranged to be positioned between a user's eye and the one or more displays; and
one or more cameras that capture an image of the user's eye, the one or more cameras being positioned such that light from the user's eye is reflected on the semi-reflective mirror to enter the one or more cameras, for analyzing an eye gaze of the user,
wherein the semi-reflective mirror is arranged to face the user's eye,
wherein the one or more cameras are arranged to capture the image of the user's eye so that the user's eye is viewed from below the user's eye, through the semi reflective mirror,
wherein the one or more cameras are arranged to be positioned below the user's eye,
wherein the one or more cameras capture images of both eyes of the user and the gaze detection device determines spatial coordinates of the user's gaze point from a parallax of the user's eyes,
wherein an optical axis of the one or more cameras does not intersect with the intersection between an eye axis of the user and the semi-reflective mirror, and
wherein edges of the semi-reflective mirror do not appear in a field of view of the user's eye.

2. The gaze detection device according to claim 1, wherein the display, the semi-reflective mirror, and the one or more cameras are enclosed in a single housing that can be secured to a head of the user as a head-mounted display.

3. The gaze detection device according to claim 1, further comprising one or more lenses facing the semi-reflective mirror, wherein the semi-reflective mirror, the one or more cameras, and one or more of the lenses are enclosed in a single casing that can be secured to a head of the user, wherein the single casing can be detached from a display.

4. The gaze detection device according to claim 1, wherein the semi-reflective mirror is a hot mirror that transmits visible light and reflects infrared light.

5. The gaze detection device according to claim 1, further comprising one or more lenses to be provided between the semi-reflective mirror and the user's eye, wherein light from the user's eye enters the one or more cameras after passing through the lens and reflected at the semi-reflective mirror.

* * * * *